United States Patent [19]
Hsu

[11] Patent Number: 5,555,106
[45] Date of Patent: Sep. 10, 1996

[54] SINGLE PASS LINE SCANNING OF AN IMAGE WITH A COLOR FILTER WHEEL HAVING A PLURALITY OF FILTERS

[76] Inventor: Steve H. Hsu, 361 Van Ness Way, Suite 301, Torrance, Calif. 90501

[21] Appl. No.: 223,094

[22] Filed: Apr. 4, 1994

Related U.S. Application Data

[63] Continuation of Ser. No. 790,726, Nov. 8, 1991, abandoned.

[51] Int. Cl.$^6$ ............................................. H04N 1/46
[52] U.S. Cl. ........................ 358/512; 358/505; 348/269; 348/271
[58] Field of Search ..................... 358/512, 505, 358/475; 348/268–271, 70, 354; 355/228, 229; H04N 1/46, 9/04

[56] References Cited

U.S. PATENT DOCUMENTS

| | | |
|---|---|---|
| 4,242,703 | 12/1980 | Tsuboshima et al. . |
| 4,739,414 | 4/1988 | Pryor et al. . |
| 4,750,211 | 6/1988 | Wray . |
| 4,769,693 | 9/1988 | Kato ........................ 348/269 |
| 4,878,109 | 10/1989 | Hillis ........................ 348/271 |
| 4,926,247 | 5/1990 | Nagasaki et al. . |
| 4,937,663 | 6/1990 | Gerlach . |
| 5,101,266 | 3/1992 | Schlig et al. . |
| 5,251,021 | 10/1993 | Parulski et al. ................ 358/475 |
| 5,276,522 | 1/1994 | Mead ........................ 348/101 |
| 5,276,760 | 1/1994 | Yokota ........................ 348/268 |

*Primary Examiner*—Kim Yen Vu
*Attorney, Agent, or Firm*—LaRiviere, Grubman & Payne

[57] ABSTRACT

A method and apparatus for digitizing color images on photographic and other media insures accurate registration between color planes and provides a digitization capability substantially equivalent to the dynamic range of photographic film.

14 Claims, 5 Drawing Sheets

SINGLE PASS LINE SCANNING OF AN IMAGE WITH A COLOR FILTER WHEEL HAVING A PLURALITY OF FILTERS

This is a continuation of application Ser. No. 07/790,726, filed Nov. 8, 1991, now abandoned.

TECHNICAL FIELD

This invention relates to color image scanning. In particular, the invention provides a low cost, high speed, color image scanner system having high precision color plane registration, digitization capability substantially equivalent to the full dynamic range of photographic film, and convenient interface with the PC/AT and Macintosh personal computer systems manufactured by IBM Corporation and Apple, Inc., respectively.

BACKGROUND ART

There are several different types of scanners available to personal computer users, generally classified as either reflective or transparency scanners. Transparency scanners are typically used to digitized 35 millimeter slide or negatives.

Reflective scanner systems process light reflected from the surface of the image media being scanned. Reflected light is collected by a scanning element, typically a charge-coupled device (CCD) array. To obtain digital color information about the image to be scanned, a series of red, blue and green filters are sequentially, placed between the image and the scanning element. A similar technique is also used in color television systems and the like.

In transparency scanner systems, light is directed through the image and collected by a scanning element the same as or similar to that used in reflective systems. Color information about the image being scanned is also obtained in the same way as in reflective systems.

Overall spacial resolutions of transparency scanners are similar to full page scanners. Thus, an 8"×11" page, digitized at 300 DPI, is approximately equivalent to a transparency scanner digitizing at 2,500 dots per inch. Color resolutions typically range between 15 bits to 32 bits per pixel. However, 24 bits per pixel color resolution is rarely achievable in present systems.

Most existing color transparency scanners must make three passes to digitize red, green and blue information. See for example U.S. Pat. No. 4,907,280. The three colored images, also referred to as color planes, must then be aligned properly to produce good quality output data. Without an expensive transparency transport system which is omitted in low-cost scanner systems, the color planes are usually, at least slightly, misaligned owing to reference sensor drift and poor alignment tolerances. Such misalignment translates into low fidelity reproduction of the original image.

Low- to mid-priced scanners currently available in the marketplace typically use a CCD with a signal-to-noise ratio greater than 256. Such a CCD allows an 8-bit binary number to represent the digitized information for each color. Because of inherent noise and quantization errors, the dynamic range of such scanners is limited to only 6 bits of useful information which correspond to 64 levels of quantization, i.e. shades. Resolution is further degraded by the nonlinearity of the CCD, especially over the range from very brightly to very dimly illuminated images. By way of comparison, the dynamic range of film can reproduce 4,000 shades.

In high-priced scanners, dynamic range is increased by using an expensive analog-to-digital (A/D) converter and associated signal conditioning electronics. Mid-priced models occasionally provide a larger dynamic range by scanning the original several times at different light intensities, which increases the scan/processing time and decreases the accuracy of color plane registration.

A single pass scanner digitizes each line of light data, collected in a single pass, three times, one digitization for each color, namely red, blue and green, before advancing to the next line. Thus, the colored filters or light sources are switched three times per line before moving to the next line. Image data is organized into a packed format which requires all of the three color components for each pixel to be stored contiguously. Thus, the scanner or computer only has to process one line of data at a time before storing or displaying that portion of the image. Consequently, single pass scanners provide a more easily displayable interim data format, and therefore require less CPU overhead.

In the prior art of scanners pertinent to the present invention, U.S. Pat. No. 4,937,663 (Gerlach) teaches an apparatus for scanning and recording a color image having a scanning element with scanning periods equal to the reciprocal of the flicker rate of a light source illuminating the color image. A rotating multi-segment color filter is rotated at a rate such that each filter segment is interposed in the image light path for a period of time greater than the reciprocal of the flicker rate.

Gerlach processes red, green and blue information for each line before indexing to the next line. The rotation rate of the color filter wheel allows each filter to expose the CCD for 11 milliseconds. During the first 8.33 milliseconds, the color information is collected by the CCD. During the remaining 2.67 milliseconds, the collected information is clocked out of the analog shift registers of a CCD.

It should be noted that Gerlach utilizes a current source powered by 60 Hz AC line voltage for the light source of his system. It also should be noted that Gerlach disposes his multi-segment filter wheel between the image light focusing subsystem and the scanning element of his system.

DISCLOSURE OF THE INVENTION

The present invention relates to a method and apparatus for digitizing color images from either reflective or transparent media while accurately insuring registration between the color planes and providing virtually the same dynamic range of color variation that is typically available from photographic film. The scanning system of the present invention digitizes the full dynamic range of photographic film without the use of expensive A/D converters, and without substantially increasing scanning time.

In the system of the present invention, ionized mercury vapor in a fluorescent lamp spontaneously emits strong ultraviolet radiation. This radiation strikes rare earth phosphors on the inside of the fluorescent tube, providing a reasonably uniform illumination at the middle of the source which in turn provides a good quality optical scattering plate. Photons of visible light travel from the lamp through the transparency, which may consist of any colored or black and white film material, such as color negatives, color positives, black and white negatives, black and white positives. The light passing through the transparency contains all the colors of the image. In order to separate the colors for digital processing, colored filters mounted on a rotatable wheel, also known as a color wheel, are used.

The color wheel of the present invention is disposed between the image to be scanned and the image light focusing subsystem, rather than between the image light focusing subsystem and the CCD scanning element as in Gerlach. By such placement of the color wheel of the present invention, smaller filters can be used to provide the light filtration required by the system which facilitates a smaller color wheel design. A smaller color wheel is easier to rotate and requires less power to do so. In addition, by providing the color wheel of the present invention with six color segments, two each of red, blue and green instead of the usual three, the rotational speed is reduced to one-half the rotational speed of a three-segment wheel to achieve lower angular velocity. Low angular velocity further reduces power consumption and generated heat, and provides longer product life and higher product reliability.

The color wheel of the present invention rotates once for every two lines of the color image scanned. Light passes through a filter segment of the wheel to the image light focusing subsystem which focuses the light onto a high resolution, linear CCD. As the color wheel rotates, sequential color separation data from the immediately preceding color is read from the CCD.

Analog color data signals, docked from the CCD, are transmitted to a low noise current amplifier where the signals are then sent to two different voltage amplifiers and associated digitizers, hereafter also A/D converters. The first A/D converter amplifies and digitizes the signals produced from the bright areas of the image media. The second A/D converter amplifies and digitizes the signals produced from the dim areas of the image media. The two signals are then combined to produce a single digitized value capable of representing substantially the entire dynamic range of the film.

The first and second A/D converters of the present invention provide expanded dynamic range of digitized color information. In processing data from the bright and dim areas of the image media, the first and second A/D converters each provide an output voltage divided into 64 equal amplitude steps which is equivalent to a dynamic range of 1.8 each. Taken together, the combined dynamic range of the first and second A/D converters of the present invention is 3.6.

In Gerlach, scanning and integration periods must be integral multiples of 8.33 milliseconds. The corresponding integration interval of the present invention may vary continuously from 8 to 15 milliseconds. In addition, it should be noted that the scanning system of the present invention may scan faster than 8 milliseconds per line.

For the same reason that cameras have bellows to control stray light in the region between the image light focusing system and the photographic film, the system of the present invention is constructed so that the region between the image light focusing subsystem and the scanning element is light tight. Therefore, only light directed toward the entrance pupil of the lens of the image light focusing subsystem can reach the scanning element. Since such light can originate only from the transparency, better quality scan data is obtained as compared to prior art scanners.

Summarizing, the system of the present invention uses a fluorescent bulb driven with a 30 KHz AC inverter and is therefore isolated from 60 Hz flicker. The system of the present invention utilizes a multi-segment, low angular velocity color wheel for high registration accuracy among color planes. Finally, the system of the present invention employs multiple A/D converters to digitize substantially the entire dynamic range of the media to be scanned.

BRIEF DESCRIPTION OF THE DRAWINGS

For fuller understanding of the present invention, reference is made to the accompanying drawing in the following description of the Best Mode for Carrying out the Invention In the drawing.

Figure 1A:
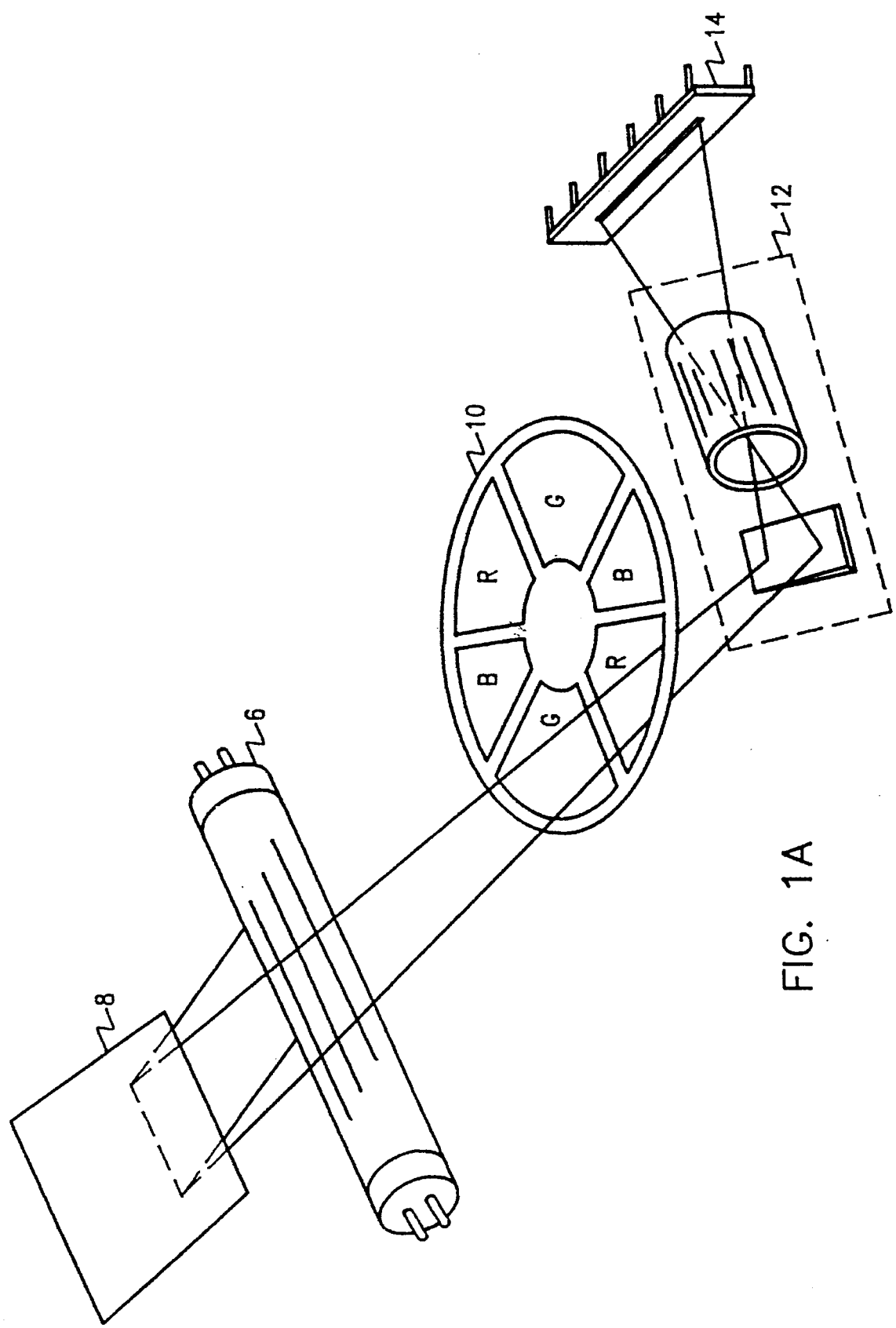
FIG. 1(A) is a perspective diagram of the color wheel of the present invention disposed between the transparency image to be scanned and the optical system for focusing filtered light onto the scanning element.

Reference numbers refer to the same or equivalent parts of the present invention throughout the several figures of the drawing.

BEST MODE FOR CARRYING OUT THE INVENTION

The principles of the present invention apply equally to reflective or transparency scanner systems. A single pass system for scanning reflective color media constructed according to the principles of the present invention is shown in FIG. 1(A), and includes rotatable multi-segment color filter wheel 10 is disposed between the image to be scanned, namely media 8, and optics subsystem 12. Light source 6 illuminates images on media 8. After reflecting from media 8 and passing through filter wheel 10 and optics system 12, light from light source 6 is received by scanning element 14. Hereafter, the principles of the present invention will be described in the context of scanning transparencies, but should be understood to apply equally to scanning of reflective media.

Figure 1B:
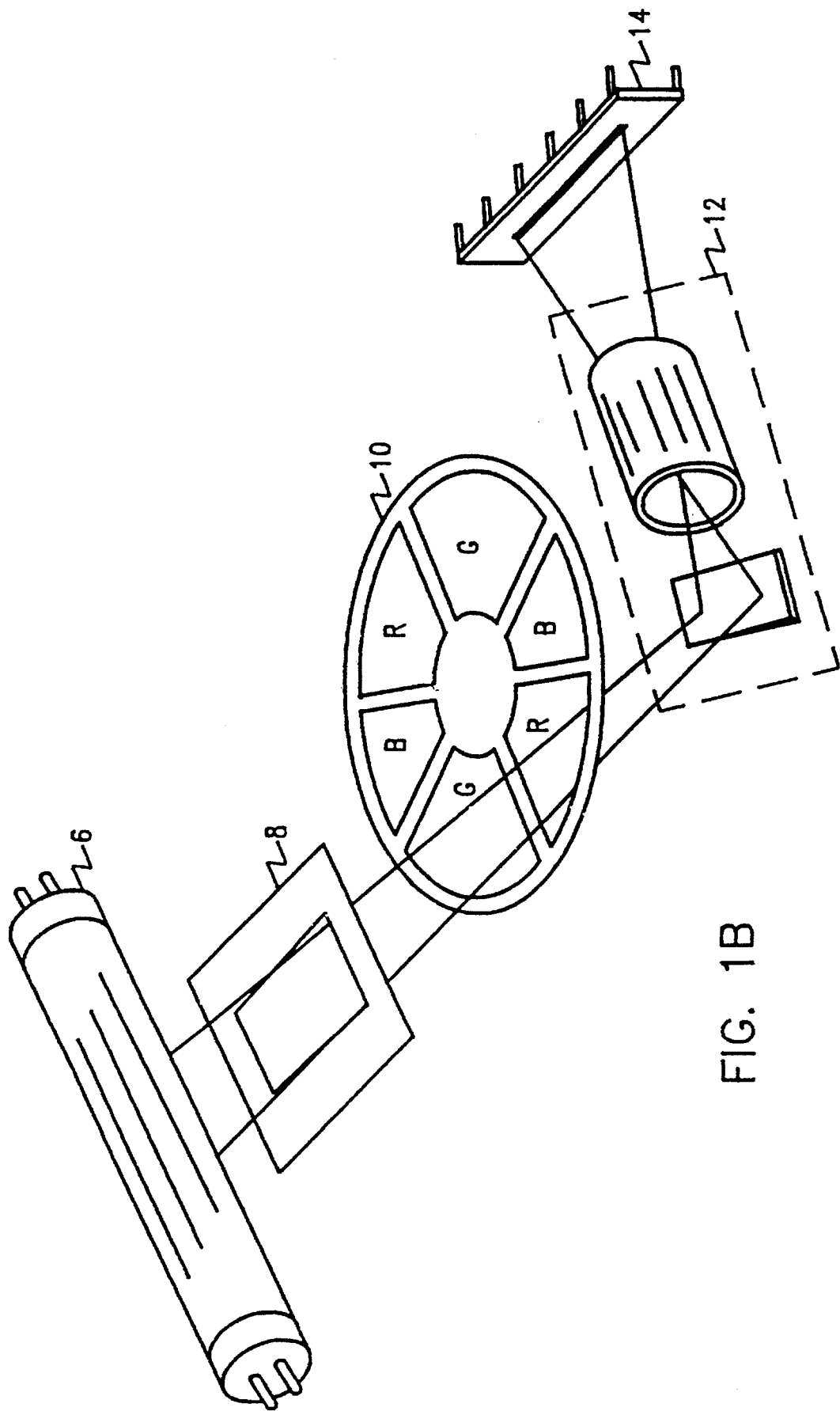
FIG. 1(B) is a perspective diagram of the color wheel of the present invention disposed between the reflective image to be scanned and the optical system for focusing filtered light onto the scanning element.

Referring to FIG. 1(B), in a single pass color transparency scanning system constructed according to the principles of the present invention, rotatable multi-segment color filter wheel 10 is disposed between the image to be scanned, namely transparency 8, and optics subsystem 12. Light source 6 illuminates images on transparency 8. After passing through transparency 8, filter wheel 10 and optics system 12, light from light source 6 is received by scanning element 14.

Light source 6 is a 4-watt fluorescent bulb with incandescent heaters at each end. The bulb is powered by an AC inverter at a frequency of 30 KHz. Therefore, power to light source 6 is completely isolated from 60 Hz AC power.

Figure 2:
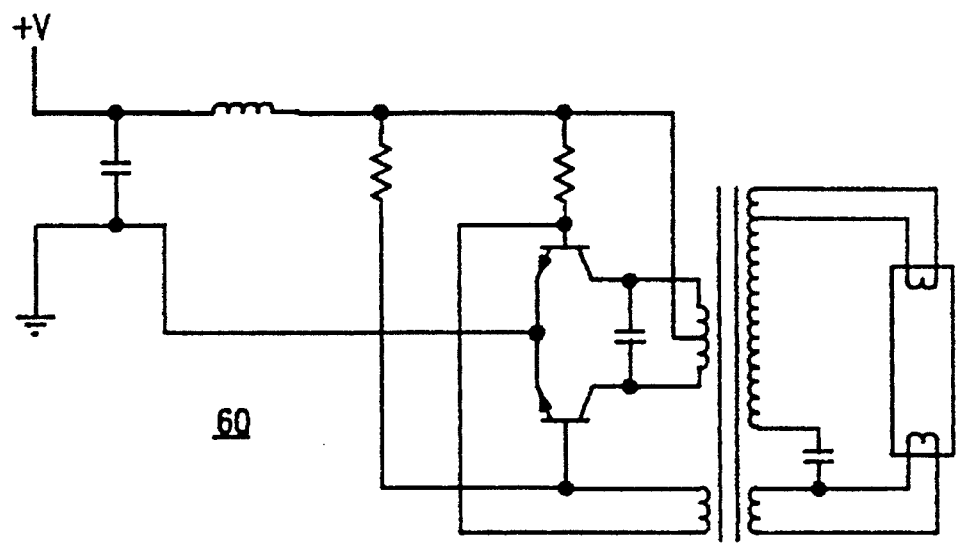
FIG. 2 is a schematic diagram of the light source power supply for the color transparency scanning system of the present invention.

Referring now to FIG. 2, inverter 60 provides both a dim and a bright mode. The bright mode is used for scanning and for calibration. By keeping the light source in the dim mode, rather than being turned off, the bulb is kept warm enough to allow scanning to start a short time after the bright mode is selected. If the bulb was turned off until it was time to scan, significant time would be required to allow the bulb to heat up and stabilize before bright mode scanning could begin. Conversely, if the bulb remained on at all times, excessive power would be consumed, unnecessary heat would be generated and product life would be shortened.

With continuing reference to FIG. 2, AC inverter 60 operates at a frequency of 30 KHz, provides a peak-to-peak voltage of 70 volts with the lamp installed and a current of 0.35 amps. Component values of the circuits shown are determined and specified in accordance with well-known principals of electrical circuit design.

Referring again to FIG. 1(B), transparency 8 is typically any 35 millimeter transmissive film having an optical density in the range of 0.2 to 3.6. If the film is mounted in a cardboard or glass mount, it is particularly easy to insert the original and index it along the subscan direction. However, if transparency 8 is not mounted, it may still be scanned by placing it in a carrier which replaces the cardboard or glass mount. The material may be a single image, such as a 35 millimeters positive slide, or in strips like 35 millimeter color negatives.

The scanning area is 24 millimeters in the main scanning direction, i.e. parallel to the longitudinal axis of CCD 14. The scanning area in the subscan direction, which is perpendicular to the longitudinal axis of CCD 14, is 35 millimeters. The image forming layer must be kept within 0.25 millimeters of the mount center. Thus, typically available commercial grade cardboard or glass mounts such as Kodak or Wess No. 2, respectively, will automatically assure focus of the film.

With continuing reference to FIG. 1(B), color wheel 10 is 3.5 inches in diameter, rotates in the range of 667 to 1,250 rpm and includes six transparent colored filter segment—alternating red, blue, green, red, blue, green as indicated. The filter sections are typically constructed of Kodak Wratten material which separate light passing through the original transparency into its three primary colors. For the red filter, Kodak Wratten number 29 is used; for green, Kodak Wratten number 61 is used; and, for blue, Kodak Wratten number 47(b) is used. Sensors detect markers on the wheel which indicate the color and beginning of the segment.

Color wheel 10 is rotated by a 24 step per revolution stepping motor. Each color segment must pass between transparency 8 and optics subsystem 12 every 8 to 15 milliseconds. Thus, the motor must step every 2 to 3.75 milliseconds.

Optics subsystem 12 images light from color wheel 10 onto the light receiving elements of CCD 14. The image light focusing system includes a mirror and is corrected for color and other aberrations to twice the Nyquist sampling frequency. The effective focal length of the optical system 12 is 1.1 inch and the f number is 5.5, if focused at infinity.

Image sensing element 14 may be a Toshiba Model No. TCD143 charge coupled device (CCD), having 2,592 active pixels. Each pixel is 11 microns wide and 11 microns tall. The average integration time is approximately equal to the average filter exposure time, i.e. 8 to 15 milliseconds.

Figure 3:
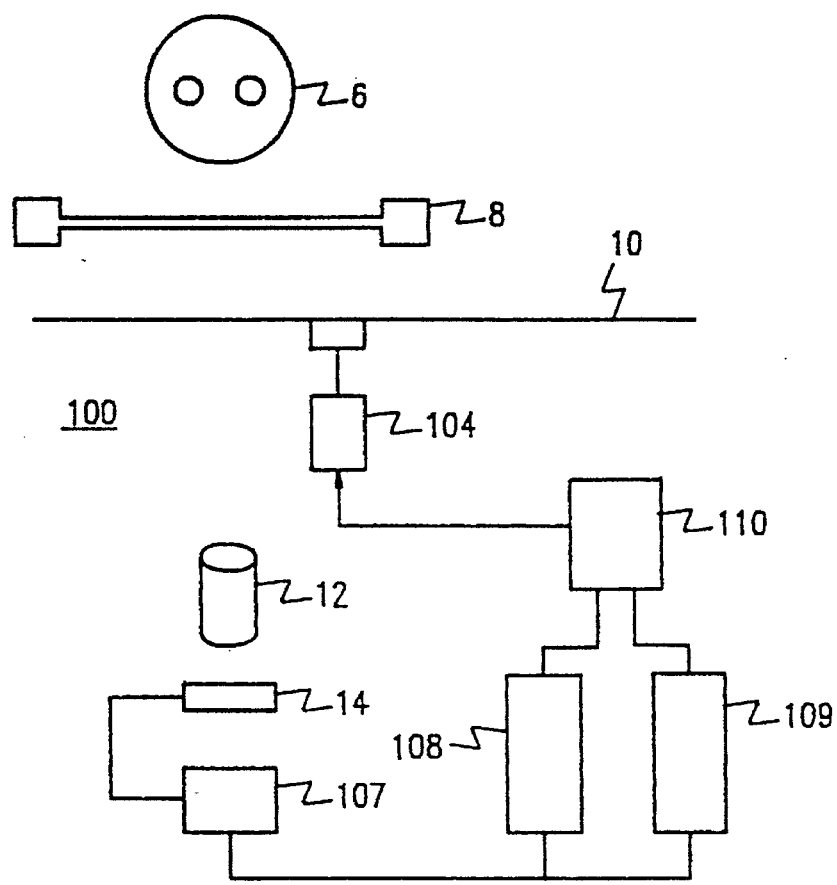
FIG. 3 is the block diagram of the color media scanning system constructed according to the present invention.

Referring now to FIG. 3, single pass color transparency scanning system 100 comprises light source 6, transparency 8, color wheel 10 driven by stepper motor 104 which is coupled to microcontroller 110. After filtered image light is received by scanning element 14, the analog signals are clocked from CCD 14 to low noise current amplifier 107 from which amplified signals representing the color data are then transmitted to A/D converters 108 and 109. A/D converter 108 amplifies and digitizes signals produced from the bright areas of transparency 8. A/D converter 109 amplifies and digitizes signals produced from the dim areas of transparency 8. The digital data signals from amplifiers 108 and 109 are then combined by micro-controller 110 to produce a single, digital signal representing scanned data.

As indicated elsewhere in this specification, the scanning system of the present invention is capable of providing digital data representing substantially the entire dynamic range of transparency film. In order to provide such enhanced dynamic range, the optical density of film in different color ranges at different light source intensities must be accommodated.

Figure 4A:
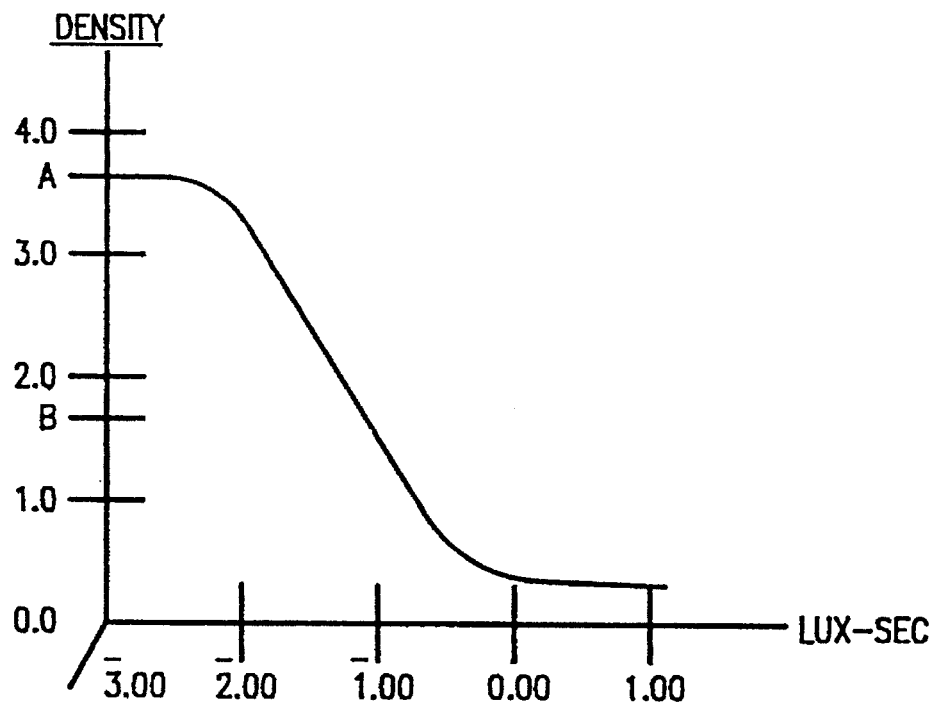
FIG. 4(A) is a characteristic curve of optical response to green light for Kodak Ektachrome 64 film.
Figure 4B:
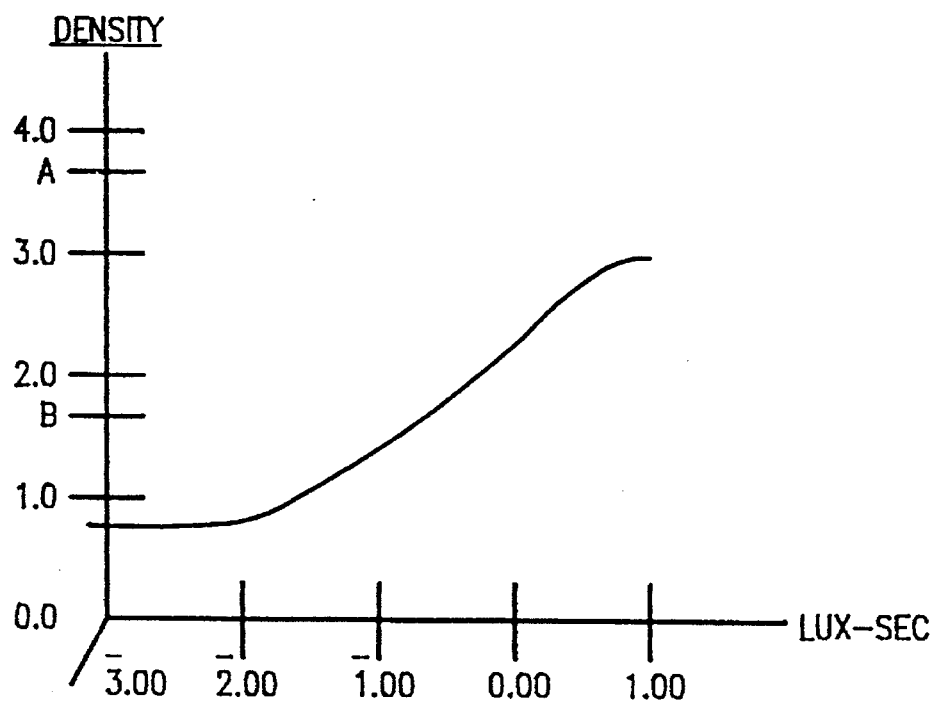
FIG. 4(B) is a characteristic curve of optical response to green light for Kodak Vericolor II film.

The optical density of transparency film is measured as a function of varying intensities of exposure. Optical density is the negative of the logarithm to the base 10 of transmissivity. Transmissivity is the intensity of transmitted light divided by the intensity of incident light. Referring now to FIGS. 4(a) and 4(b), the optical density of Kodak Ektachrome 64 film to green light is shown. Lux is the lumens per square meter, which is proportional to the power of visible light incident on the film. Exposure, measured in lux-sec, is proportional to the total visible light energy falling on the film per unit area. Thus, the dynamic range of Ektachrome 64 film is from 0.2 to 3.5.

Further with respect to FIGS. 4(a) and 4(b), the ordinate of each figure indicates optical density and the abscissa is the logarithm of exposure. FIG. 4(a) represents the response of Kodak Ektachrome 64 film to green light. FIG. 4(b) represents the response of Kodak Vericolor II film to green light. The response of each film to red and blue light is similar.

A/D converters 108 and 109 combine to provide digitization for the entire range of optical density, namely 0.0 to 3.6. A/D converter 108 divides the range from 0.0 to approximately 1.8 in 64 evenly divided intensity intervals or steps, from the origin reference point B in FIGS. 4(a) and 4(b). A/D converter 109 provides 64 levels of intensity intervals in the range from 1.8 to 3.6, from reference point B to reference point A in both FIGS. 4(a) and 4(b).

A/D converter 108 comprises a low-gain amplifier, as low as times 1 gain, and an 8-bit A/D converter for digitizing signals produced from the bright areas of the transparency 8, also known as the high end of the light intensity for each color. A/D converter 108 includes real time programmable adjustments for dark and light calibration for each pixel and for each color.

A/D converter 109 includes a high gain amplifier, as high as times 64 gain, and an 8 bit A/D converter for digitizing the bottom 64 levels of light for each color. The amplifier also contains real time programmable adjustments for dark and light calibration for each pixel and for each color.

Referring again to FIG. 3, microcontroller 110 is a microprocessor-based digital controller used to create black and white shading values, execute calibration, control input/output (I/O), provide memory management and timing sequencing, gama curve table look-up and host computer interface (I/F) functions. Microcontroller 110 controls the opto-mechanical operation of the transparency transport and electronic synchronization of the scanning system of the present invention. The host computer may be either an IBM PC A/T or Apple Macintosh personal computer.

The addressing functions of microcontroller 110 combine the output digital signals from amplifiers 108 and 109 to provide a total digital dynamic range equal to an optical density of 3.6, a range equal to approximately 4,000 of the darkest intensity levels. Thus, the scanning system of the present invention provides a range of 4,000 digitized levels spanning the entire dynamic range of photographic film, i.e. 0.2 to 3.6.

Referring now to FIG. 3, more details for a single pass transparency color scanning system constructed according to the present invention are provided. In the light path, light source 6 illuminates transparencies 8 mounted in a slide carrier 9. Light transmitted from transparency 8 passes through color rotating color wheel 10 and optics subsystem 12 and is received by scanning element 14. Data from scanning element 14 is clocked into current amplifier 107 from which the amplified data is transmitted to A/D converters 108 and 109.

The single digital signal representing scanned data is a signal comprising a 12-bit number for each pixel, and capable of representing virtually the entire dynamic range of film reconstructed from the two 8-bit numbers produced by A/D converters 108 and 109. The 12-bit numbers are computed by host computer 120 in cooperation with microcontroller 110 in accordance with computations described below.

If the 8-bit value from amplifier 108 is Value (1) and the 8-bit value from amplifier 109 is Value (2), then the final 12-bit value will be called the Final Value. Using familiar "C" notation:

$$\text{Final\_Value} = ((\text{Value}(1) \ \& \ 0xFE) << 4) | ((\text{Value}(2) \ \& \ 0xF8) >> 3)$$

The above computation may be performed by relatively low power CPUs. If the host computer is powerful enough to perform floating point calculations, and has adequate random access memory (RAM), the following calculation may be performed:

$$\text{Final\_Value} = (\text{Value}(1) << 4) * \text{alpha}[\text{Value}(1)][\text{Value}(2)] + \text{Value}(2) * (1 - \text{alpha}[\text{Value}(1)][\text{Value}(2)])$$

where "*" indicates multiplication, and alpha [Value(1)] [Value(2)] is an array organized as alpha [0 . . . 255][0 . . . 255] and is more fully described below. Alpha is initialized to all ones. In theory, alpha [i][j] must occupy 64 KWords of memory, where a word equals 16 bits, or 2 bytes. In practice, large sections of alpha [i][j] are not allowed, therefore the array is reduced to under 1 KWord. From known values of optical density, and therefore of transmissivity, provided during a calibration procedure described elsewhere in this specification, the values of alpha [i][j] are adjusted to produce a Final_Value that most closely matches the known values in a calibration slide.

For example, if two values of optical density, O.D., are scanned, O.D. 1.0 and O.D 2.0, then the following digitized values are produced by A/D converters 108 and 109

| O.D.     | 1.0 | 2.0 |
|----------|-----|-----|
| Value(1) | 25  | 2   |
| Value(2) | 255 | 42  |

The Final_Value is transmissivity ($10^{-O.D.}$) times the digitization range (0xFFF. or 4095). Thus, the Final_Value is given by solving for alpha [Value(1)][Value(2)] in the Final_Value equation as given below:

$$\text{alpha}[\text{Value}(1)][\text{Value}(2)] = (4095 \ (10^{-O.D.} \ \text{Value}(2))) / (18 \ \text{Value}(1) \ \text{Value}(2))$$

Performing the indicated operations, then $$\text{alpha}[25][255] = 1.066$$

$$\text{alpha}[2][42] = 0.105$$

where alpha[i][j] is a one dimensional parametric function of O.D. embedded in a two dimensional integer space ([i][j]). Because of analog noise and digitization error, the one dimensional curve gains thickness and becomes a mapping of a portion of [i]×[j] into the real numbers. The thickness of the important region is referred to as delta. The only alpha values required are those corresponding to a reasonable distance from the center of the curve, therefore we use 3* delta is used as a reasonable distance. Any [i][j] that is greater than 3* delta away from the center is mapped to the closest [i][j] in the important region. Fortunately, such [i][j] combinations occur so infrequently that essentially no effect on image quality is noticed.

The system of the present invention corrects for light and dark variation so well that the digitized value is highly linear to the exposure. Therefore, once the known values of O.D. have been used to generate their corresponding alphas, further [i][j] combinations are derived from linearly interpolating between the known O.D.s, and predicting the corresponding Value(1) and Value(2). The associated alpha [Value(1), Value(2)] is calculated as described above.

The calibration procedure for the scanning system of the present invention corrects for non-uniformity of CCD pixel response (both light and dark), $Cos^4$ light intensity falloff, vignetting and dark current noise. In the calibration process, A/D converters 108 and 109 record bright and dark values for each pixel for all three colors by digitizing a calibrated film built into the transparency transport. The film contains specified values of optical density. Thereafter, the scanner adjusts the gain of the amplifiers of A/D converters 108 and 109 to ensure that each digitized value is correct. While this procedure produces substantial data to store and process, about 32 KBytes, it assures nearly error-free digitization for color data over and enhanced dynamic range.

Figure 5:
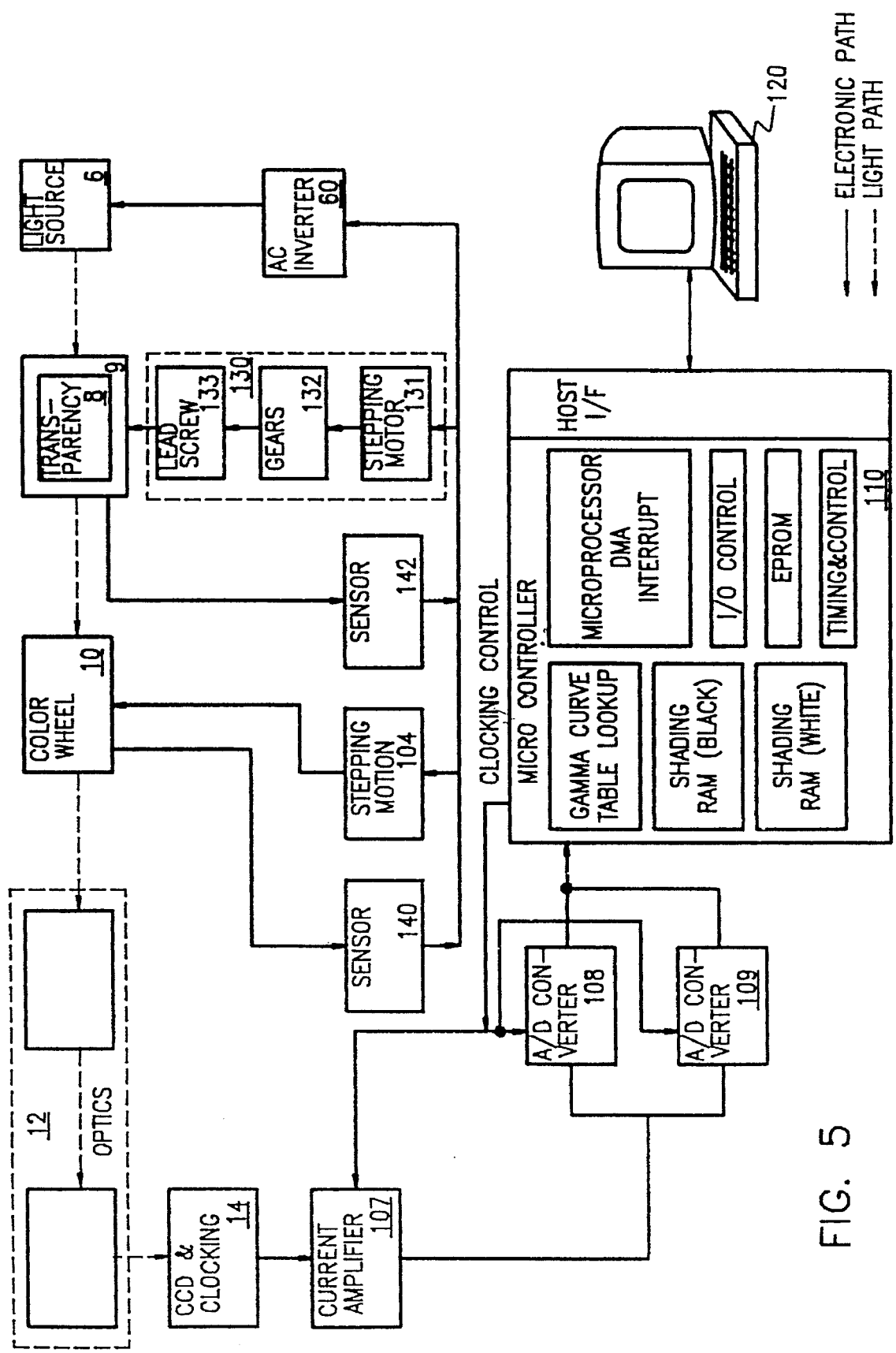
FIG. 5 is a detailed block diagram of the color media scanning system of FIG. 3.

Referring again to FIG. 5, transparency transport system 130 includes stepping motor 131, gear train 132 and lead screw 133. Transport system advances transparency 8 eleven microns per step. Transparency carrier 9 is affixed to two precision shafts and is coupled to lead screw 133. Position sensors are used to ensure precise start and stop points. Position is measured only in the direction of motion, herein also referred to as the subscan direction.

The registration between color planes of the scanning system of the present invention differs substantially from contemporary scanners. Only a single pass in the subscan direction is needed to capture the red, green and blue colors from a colored original transparency because all three of the colors are digitized for a given scan line before the transport mechanism is advanced to the next line for scanning. To ensure that perfectly aligned, blur free color registration is achieved, stepping motor 131 is stepped and halted before the first color (usually, red) is digitized.

Color wheel position detection sensors 140 comprise both a means to determine when each filter is in position to allow scanning, and to determine the color of each filter. A reflective sensor detects an infrared absorbing stripe on the outside of color wheel 10 when one of the red filters lines up properly. A photodiode detects one of six holes punched in the inner circle of color wheel 10. An associated light emitting diode mounted on the opposite side of the wheel generates continuous light which activates the photodiode when one of the six holes passes between them. In operation, they indicate to the system the instantaneous position of the multisegmented color wheel. For example, in operation, the sensors indicate to the system the instantaneous position of the multisegmented color wheel. First, microcontroller 110 receives a signal from the reflective sensor, which indicates that the next signal from the photodiode will be associated with a red filter. Microcontroller 110 then waits for the photodiode signal and processes the red data. The next photodiode signal is associated with green data, then blue, then back to red, and so forth.

The present invention has been particularly shown and described with respect to certain preferred embodiments of features thereof. However, if should be readily apparent to those of ordinary skill in the art that various changes and modifications in form and de, tails may be made without departing from the spirit and scope of the invention as set forth in the appended claims.

I claim:

1. A system for line-by-line, single pass color image scanning of an image on an image media, the image having color, the system comprising:

a light source for providing substantial uniform illumination;

means for providing a high frequency current to the light source, the high frequency current sufficient for isolating flicker;

a holding means for affixing the image media thereto, the holding means and image media combination in operative proximity to the light source for providing substantially uniform illuminating to the image to provide a first optical signal;

a light filtering means in operative proximity to the image media for receiving the first optical signal from the image as illuminated and for selectively filtering the first optical signal to provide a second optical signal, the light filtering means including a plurality of sets of color segments for selectively filtering the first optical signal, the plurality of sets of color segments sufficiently translucent to allow the first optical signal to pass in part through the plurality of sets of color segments to provide the second optical signal;

a light focusing subsystem in operative proximity to the light filtering means for receiving the second optical signal and for focusing the second optical signal to provide a third optical signal, the light filtering means disposed between the image media and the light focusing subsystem;

a sensor means in operative proximity to the light focusing subsystem for receiving the third optical signal and for converting the third optical signal to an electrical image signal, the sensor means and the light focusing subsystem optically aligned with the light filtering means such that an aperture of the light focusing subsystem need not completely clear the light filtering means for obtaining valid data, the sensor means not having separate sensor arrays for separate colors and lines;

digitizing means for receiving the electrical image signal and for providing a digitized electric image signal; and processing means for receiving the digitized electric image signal and for providing an electronic representation of the image spanning a dynamic range of optical density from 0.0 to 3.6.

2. A system, as recited in claim 1, wherein the light source is a fluorescent lamp having ionized mercury vapor and phosphors in operative combination for providing uniform illumination.

3. A system, as recited in claim 2, wherein the means for providing the high frequency current includes an inverter, the inverter having both a dim mode and a bright mode for operation.

4. A system, as recited in claim 1, wherein the light filtering means is a rotatable color wheel.

5. A system, as recited in claim 4, wherein the plurality of sets of color segments are disposed about the rotatable color wheel for alternating in color.

6. A system, as recited in claim 5, wherein the plurality of sets of color segments each include a red, a blue and a green segment.

7. A system, as recited in claim 5, further comprising a motor, the motor coupled to the rotatable color wheel for rotating the rotatable color wheel.

8. A system, as recited in claim 7, wherein the rotatable color wheel is rotated such that each of the plurality of sets of color segments passes between the image and the light focusing subsystem in a range for approximately every 8 to 15 milliseconds, and the fluorescent lamp is driven by approximately a 30 KHz alternating current to isolate flicker.

9. A system, as recited in claim 1, wherein the light focusing subsystem includes a mirror for correcting aberrations to at least twice the Nyquist sampling frequency.

10. A system, as recited in claim 1, wherein the sensor means is a charge-coupled device array, the charge-coupled device array having an average integration time in a range of approximately 8 to 15 milliseconds, the average integration time capable of being varied throughout the range independent of the light source flicker rate.

11. A method for line-by-line, single pass color image scanning of a color image, the method comprising the steps of:

powering a light source with a high frequency current sufficient for isolating flicker;

providing light with the light source;

holding the color transparency in operative proximity to the light source, the light passing through the color transparency to provide image light;

rotating a rotatable wheel having a plurality of color filters mounted thereon for filtering light, the image light passing through the color filters while rotating the rotatable wheel;

focusing the image light, after having passed through the color filters, with a light focusing subsystem, the color filters being disposed between the light focusing subsystem and the image;

imaging, after focusing, the image light on a scanning element of an image processing circuit for converting the image light to an electric image signal, the scanning element not having separate sensor arrays for separate colors and lines;

obtaining valid data prior to one of the plurality of color filters having an aperture length of the light focusing subsystem optically completely within the one of the plurality of color filters; and digitizing the electric image signal for providing a digitized electric image signal; and providing the digitized electric image signal to a processing means for providing an electronic representation of the image spanning a dynamic range of optical density from 0.0 to 3.6.

12. A method for line-by-line, single pass color image scanning of a color transparency, as recited in claim 11, further comprising the steps of:

clocking the scanning element for providing the electric image signal;

amplifying the electric image signal; and providing the electric image signal to an analog to digital conversion means for digitizing and for providing the digitized electric image signal.

13. A method for line-by-line, single pass color image scanning of a color transparency, as recited in claim 12, wherein the analog to digital conversion means includes at least two analog to digital converters.

14. A method for line-by-line, single pass color image scanning of a color transparency, as recited in claim 13, further comprising the steps of:

dividing the electric image signal between the analog to digital converters into a high intensity signal and a low intensity signal; and combining the high intensity signal and the low intensity signal with the processing means.

* * * * *